C. L. COOKE,

Assignor of one-half interest to W. V. Kish.

RAILWAY-SWITCH.

No. 7,690. Reissued May 22, 1877.

Chas. J. Buckheit
George H. Sykes } Witnesses

Charles La Cooke Inventor
By Edward Wilhelm
Attorney

N. PETERS, PHOTO-LITHOGRAPHER, WASHINGTON, D. C.

UNITED STATES PATENT OFFICE

CHARLES L. COOKE, OF BUFFALO, NEW YORK, ASSIGNOR OF ONE-HALF INTEREST TO WILLIAM V. KISH, OF SAME PLACE.

IMPROVEMENT IN RAILWAY-SWITCHES.

Specification forming part of Letters Patent No. 121,158, dated November 21, 1871; reissue No. 7,690, dated May 22, 1877; application filed April 10, 1877.

*To all whom it may concern:*

Be it known that I, CHARLES LEE COOKE, of the city of Buffalo, in the county of Erie and State of New York, formerly of the town of Shortsville and State of New York, have invented certain new and useful Improvements in Railway-Switches, which improvements are fully set forth in the following specification, reference being had to the accompanying drawing.

My invention relates to that class of switches which are provided with a device for preventing the wheels from running off the rails to the ground when the switch has been improperly placed.

The object of my invention is to construct a safety-switch of this class which shall guide the wheels upon the proper track in a natural and easy manner, without any sudden or abrupt changes of motion, and which shall be constructed of substantially the same material of which the main track is composed, so as to avoid injury to or breakage of the wheels as they pass over the switch.

The nature of my invention will be fully understood from the following description.

Figure 1:
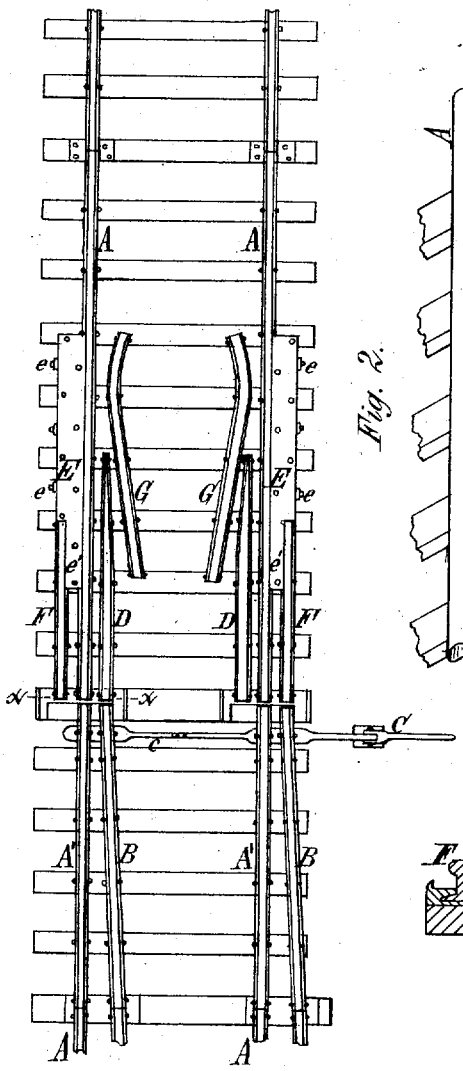
Figure 2:
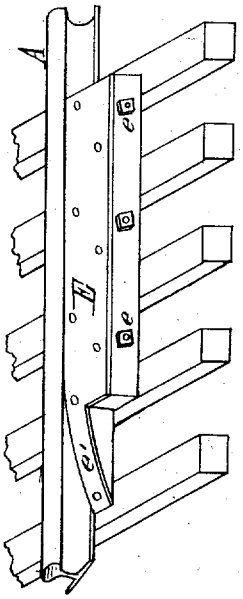
Figure 3:
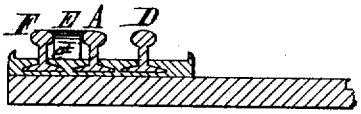

In the accompanying drawing, Figure 1 is a top-plan view of a switch provided with my improvements. Fig. 2 is a detached perspective view of the flange-supporter. Fig. 3 is a fragmentary cross-section in line *x x*, Fig. 1.

Like letters of reference refer to like parts in each of the figures.

A A represent the rails of the main track, and A′ A′ the main switch-rails, forming continuations thereof. B B represent the rails of the siding, connected with the rails A′ A′ by a rod, *c*, operated by a lever, C, in the usual manner, so that the free ends of either the rails A′ A′ or B B may be placed opposite the main rails A A. D represents two pointed rails, arranged on the inner side of the main rails A A, so as to form a continuation of the inner switch-rails. E represents the flange-supporting blocks, arranged on the outer side of the main rails A; and F, a rail-section, forming a continuation of the outer switch-rail, and abutting against the flange-supporter E. The latter is preferably composed of a wooden body, secured to the main rails by bolts *e*, and a plate-iron covering secured to the wooden body by countersunk screws or rivets, or in any other suitable manner. The upper side of the flange-supporter E is made flush with the tread of the rails A and F, and of a width to extend to the outside of the tread of the rail F. *e′* is an inclined or wedge-shaped lip, formed at the forward end of the flange-supporter E, between the rails A and F, as clearly shown in Figs. 1 and 2.

G are two guide-rails, arranged at an angle on the inner side of the pointed rails D and main rails A, and having their forward ends opposite the inclined lips *e′* of the flange-supporter E, so that one wheel will be fully under the control of the guide-rail G before the other wheel leaves the rail-section F. The rear ends of the guide-rails G approach the main rails to such a distance as to cause the wheel running on the flange-supporter to cross the adjacent main rail and drop into the main track before the opposite wheel leaves the guide-rail G.

When a locomotive or car comes in on the wrong track, in the drawing on the rails B B, the right-hand wheels will pass from the rail B upon the rail-section F, while the left-hand wheels will pass upon the pointed rail D. The rails D and F, being fixed in their relative position to the main track, guide the wheels along in a perfectly steady and safe manner until the flange of the right-hand wheel strikes the inclined lip *e′* of the flange-supporter E, when the right-hand wheel begins to rise thereon, but is still held by the rail F. At the same time the left-hand wheel comes in contact with the guide-rail G, which gives both wheels a tendency to travel toward the main track, which tendency is increased as the right-hand wheel mounts the support or block E and runs on the larger circle of its flange. Both wheels now travel under these combined influences toward the main track, and finally drop into the same without being subjected to any sudden change in their movement.

The flange-supporter E, being composed of wood and an iron covering, has a certain degree of elasticity, and does not stiffen the main track, as heavy cast parts do, thereby preventing the chipping off or breaking of the wheels as they run over the switch in ordinary use.

The flange-supporting blocks E and rail-sections F, when worn out, are readily replaced by new ones without interfering with the use of the track.

Having thus fully described my invention, what I claim as new, and desire to secure by Letters Patent, is—

1. The combination, with the main-track rails A A and switch-rails B B, of the flange-supporting blocks E E, secured to the outer side of the main rails, and rail-sections F F, connecting the flange-supporting blocks with one or the other of the outer switch-rails, substantially as and for the purpose hereinbefore set forth.

2. The combination, with the main-track rails A A and switch-rails B B, of the flange-supporting blocks E, secured to the outer side of the main rails, and provided with inclined lips $e'$ and rail-sections F, points D, and guide-rails G, arranged as shown and described, substantially as and for the purpose hereinbefore set forth.

3. The combination, with the main-track rails A, pointed rails D, guide-rails G, and rail-sections F, all constructed of rails, of the flange-supporters E, constructed of wood, and provided with a covering of plate-iron, substantially as and for the purpose hereinbefore set forth.

C. L. COOKE

Witnesses:
WILLIAM V. KISH,
EDWARD WILHELM.